(12) United States Patent
Taeger et al.

(10) Patent No.: US 8,894,908 B2
(45) Date of Patent: *Nov. 25, 2014

(54) PROCESS FOR PRODUCTION OF A DIE FOR THE PRODUCTION OF SURFACE-STRUCTURED COATING (FINISH)

(75) Inventors: Tilman Lüdecke Taeger, Seeheim-Jugenheim (DE); Klaus Schultze, Frankenthal (DE); Jens Schadebrodt, Mainz (DE)

(73) Assignee: BASF SE, Ludwigshafen (DE)

(*) Notice: Subject to any disclaimer, the term of this patent is extended or adjusted under 35 U.S.C. 154(b) by 493 days.

This patent is subject to a terminal disclaimer.

(21) Appl. No.: 12/376,809

(22) PCT Filed: Aug. 8, 2007

(86) PCT No.: PCT/EP2007/058235
§ 371 (c)(1),
(2), (4) Date: Feb. 9, 2009

(87) PCT Pub. No.: WO2008/017690
PCT Pub. Date: Feb. 14, 2008

(65) Prior Publication Data
US 2009/0242112 A1    Oct. 1, 2009

(30) Foreign Application Priority Data
Aug. 10, 2006 (DE) .......... 10 2006 037 415

(51) Int. Cl.
| | | |
|---|---|---|
| B29C 33/42 | (2006.01) | |
| B23K 26/00 | (2014.01) | |
| D06N 3/00 | (2006.01) | |
| B32B 9/02 | (2006.01) | |
| B23K 26/30 | (2014.01) | |
| D06N 3/12 | (2006.01) | |
| B29C 33/40 | (2006.01) | |
| C14C 11/00 | (2006.01) | |
| B44C 1/18 | (2006.01) | |
| B23K 26/40 | (2014.01) | |

(52) U.S. Cl.
CPC .......... *B29C 33/405* (2013.01); *B23K 26/0084* (2013.01); *D06N 3/0097* (2013.01); *B32B 9/02* (2013.01); *B23K 26/421* (2013.01); *B29C 33/424* (2013.01); *D06N 3/128* (2013.01); *C14C 11/003* (2013.01); *B44C 1/18* (2013.01); *B23K 26/4065* (2013.01); *Y10S 428/904* (2013.01)
USPC ............................ 264/482; 264/446; 428/904

(58) Field of Classification Search
None
See application file for complete search history.

(56) References Cited

U.S. PATENT DOCUMENTS 5,798,202 A    8/1998 Cushner et al.
7,758,012 B2 *   7/2010 Schafer .......................... 249/55

(Continued)

FOREIGN PATENT DOCUMENTS

| DE | 2111628 | 9/1972 |
|---|---|---|
| DE | 202005003532 U1 * | 6/2005 |
| EP | 0640043 B1 | 1/1996 |
| EP | 0640044 B1 | 3/1996 |

(Continued)

*Primary Examiner* — Benjamin Schiffman
(74) *Attorney, Agent, or Firm* — Drinker Biddle & Reath LLP

(57) ABSTRACT

A die for the production of a surface-structured coating (finish) which can be bonded to a sheet-like substrate, in particular a leather, an imitation leather material, a textile material or a wood surface, and which is formed by application of a liquid plastic material to the surface of the die and subsequent solidification of the plastic material, the die having a surface structure corresponding to the surface structure of the coating, the surface comprising, on a substrate, surface structure elements which are arranged in a screen and may be in the form of elevations or depressions, wherein the surface structure of the die has an identification with the surface structure differing from the environment.

10 Claims, 3 Drawing Sheets

(56) References Cited

U.S. PATENT DOCUMENTS

| | | |
|---|---|---|
| 2004/0115562 A1 | 6/2004 | Kaczun et al. |
| 2004/0119202 A1* | 6/2004 | Helber et al. ............... 264/293 |
| 2004/0159977 A1* | 8/2004 | Perfetto et al. ............. 264/293 |
| 2007/0082176 A1 | 4/2007 | Schaefer |
| 2008/0224356 A1 | 9/2008 | Taeger et al. |

FOREIGN PATENT DOCUMENTS

| | | |
|---|---|---|
| FR | 2257401 | 8/1975 |
| WO | WO-2005/035798 A1 | 4/2005 |
| WO | WO-2005/047549 A1 | 5/2005 |
| WO | WO-2007/033968 A2 | 3/2007 |

* cited by examiner

PROCESS FOR PRODUCTION OF A DIE FOR THE PRODUCTION OF SURFACE-STRUCTURED COATING (FINISH)

RELATED APPLICATIONS

This application is a national stage application (under 35 U.S.C. §371) of PCT/EP2007/058235, filed Aug. 8, 2007, which claims benefit of German application 102006037415.0, filed Aug. 10, 2006.

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to dies having an identification (e.g. security feature, logo) for the production of a coating (decorative finish) which can be bonded to a sheet-like substrate, in particular a leather or a textile material, such as a nonwoven, woven fabric or knitted fabric, or a wood surface, and which is formed by application of a liquid plastic material to the surface of the die and subsequent solidification of the plastic material, the identification being transferred to the coating. The invention furthermore relates to a process for the production of the dies by means of laser engraving. The invention furthermore relates to laser-engraved dies having the identification, which are obtainable by the process.

2. Description of Related Art

In the direct laser engraving technique, a three-dimensional structure is engraved directly into a material surface. This technique has attracted broader economic interest only in recent years with the appearance of improved laser systems. The improvements in the laser systems include better focusability of the laser beam, higher power and computer-controlled beam guidance.

Direct laser engraving has a plurality of advantages over conventional, for example mechanical, structuring processes. For example, three-dimensional motif elements can be individually formed in the laser engraving technique. Certain elements can be produced so as to be different from other elements, for example with regard to depth and steepness. Furthermore, in principle any digital original motif can be engraved into a material surface by means of the laser engraving technique after suitable conversion into a three-dimensional relief image, whereas, in conventional structuring techniques, the three-dimensional shape of elements is limited whether by a natural three-dimensional original or the geometry of the imaging tool. Finally, the laser engraving process is highly automatable so that the entire process is not very susceptible to individual errors and is very readily reproducible. In this way, structured materials can be produced in high constant quality.

EP-A 0 640 043 and EP-A 0 640 044 disclose, respectively, one-layer and multi-layer elastomeric laser-engravable recording elements for the production of flexographic printing plates. The elements consist of reinforced elastomeric layers. For the production of the layer, elastomeric binders, in particular thermoplastic elastomers, such as SBS, SIS or SEBS block copolymers, are used. As a result of the so-called reinforcement, the mechanical strength of the layer is increased in order to permit flexographic printing. The reinforcement is achieved either by introducing suitable fillers, photochemical or thermochemical crosslinking or combinations thereof.

WO 2005/047549 describes a process for the production of a finish for leather, in which the finish is produced on a silicone rubber substrate, the substrate having a structured surface corresponding to the grain structure of the finish. Furthermore, the process for the production of a substrate provided on its visible side with a finish having a grain structure, in particular a grain leather, a split leather having a buffed top or a synthetic suede material having a top consisting of microfibers, is disclosed, first, for the formation of the finish, an aqueous plastic dispersion being applied to a substrate consisting of a silicone rubber and having a structured surface corresponding to the grain structure of the finish and being left to solidify to form a film.

Product piracy has become a serious problem for the economy. Modern production techniques and the worldwide exchange of goods make it easy today to produce virtually identical copies of profitable products and introduce them into lucrative domestic and foreign markets. Inter alia, the products of the leather, textile, shoe and apparel industry and the furniture industry are affected. It is therefore desirable to provide the surface-structured decorative finishes with a security identification which can be copied only with difficulty.

BRIEF SUMMARY OF THE INVENTION

It is an object of the invention to provide dies for the production of surface-structured decorative finishes, such as finishes for the coating of leather, which have a security feature, logo or other identification and thus guarantee the authenticity of the goods, it being necessary for the dies to be difficult to copy. The coatings should meet the current high requirements with regard to water permeability, fastness, abrasion resistance and haptic properties. In particular, the coatings should also meet the high requirements of the automotive industry with regard to fastness and haptic properties for the interior trim.

The object is achieved by a die for the production of a surface-structured coating (finish) which can be bonded to a sheet-like substrate, in particular a leather, an imitation leather material, a textile material or a wood surface, and which is formed by application of a liquid plastic material to the surface of the die and subsequent solidification of the plastic material, the die having a surface structure corresponding to the surface structure of the coating, the surface comprising, on a substrate, surface structure elements which are arranged in a screen and may be in the form of elevations or depressions, wherein the surface structure of the die has an identification with the surface structure differing from the environment.

The surface structure differing in the region of the identification gives rise to refraction, light scattering or reflection of the surface which differs from the environment in the region of the identification, with the result that the identification is made visible.

Identifications are, for example, inscriptions and logos and any desired characters which may serve for identifying the goods.

In addition to the coarse surface structure formed by the surface structure elements, the surface may also have a fine surface structure, for example, a microroughness of the substrate. The identification can be produced by a difference both in the coarse surface structure and in the fine surface structure (e.g. roughness of the substrate) from that of the environment of the identification.

In an embodiment of the invention, the identification is produced by virtue of the fact that, in the region of the identification, the surface structure elements differ with respect to size, shape and/or arrangement from the surface structure elements surrounding the identification.

In a further embodiment of the invention, the identification is produced by virtue of the fact that, in the region of identification, the roughness of the substrate (fine surface structure) differs from that of the environment.

The surface structure elements inside identification may differ with respect to their size, in particular in diameter and/or height, from the surface structure elements outside the identification. Thus, the surface structure elements in the region of the identification may be higher or lower relative to the substrate and/or may have a larger or smaller diameter than outside the identification. Furthermore, the substrate in the region of the identification may be lower or higher than outside the identification.

The surface structure elements inside and outside the identification may differ with respect to their shape. For example, the surface structure elements inside the identification may be circular and those outside the identification may be square. They may also differ inside and outside the identification with respect to their flank shape.

The surface structure elements may be different with respect to their arrangement. Thus, the screen type inside and outside the identification may differ. In the case of autotypical screens, the screen angle may differ. Furthermore, the dot spacings inside and outside the identification may be different. Thus, the surface structure elements may be arranged more densely or less densely. Furthermore, the dot positions in the region of the identification may be shifted relative to the screen outside the identification.

The identification may be a brand identification. Preferably, the identification is an inscription, for example a brand name, or a logo.

The object is furthermore achieved by a process for the production of dies according to the invention for the production of a surface-structured coating which can be bonded to a sheet-like substrate, in particular a leather or a textile material, such as a nonwoven, woven fabric or knitted fabric, which dies have an identification, the surface structure of the dies being produced by laser engraving. For this purpose, the die has a laser-engravable layer. The laser structuring process is also particularly advantageous because logos, trade marks, latent images or design elements can be integrated very easily into the surface structuring even at the digital level and can be produced in one operation.

DETAILED DESCRIPTION OF THE INVENTION

Figure 1:
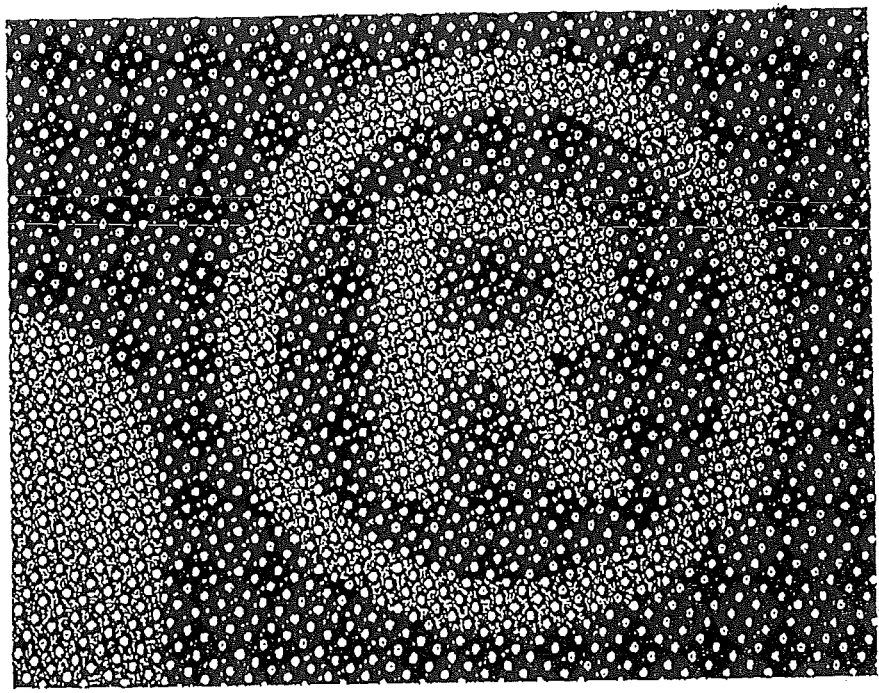
FIGS. 1-4 are surface sections of engraved positive dies.

The process according to the invention comprises
a) provision of a laser-engravable elastomeric layer or a layer composite comprising a laser-engravable elastomeric layer, if appropriate on a substrate, the laser-engravable layer comprising a binder and further additives and assistants,
b) thermochemical, photochemical or actinic reinforcement of the laser-engravable elastomeric layer and
c) engraving of a die surface structure corresponding to the surface structure of the finish into the laser-engravable elastomeric layer using a laser.

In general, the laser-engravable layer is a polymer layer. This may be present on a substrate. A precondition for the production of the dies by means of laser engraving is that laser radiation is absorbed by the polymer layer. Furthermore, a certain threshold energy of the laser beam has to be introduced into the polymer layer in order for laser engraving to be possible as a rule. The absorption of the recording layer for the chosen laser radiation should be as high as possible (the mean power density is typically >10 $kW/cm^2$, preferably >100 $kW/cm^2$).

In the laser structuring of the polymer layers, large amounts of material must be removed. Powerful lasers are therefore preferred. For example, $CO_2$ lasers having a wavelength of 10640 nm can be used for laser structuring. Very powerful $CO_2$ lasers are commercially available. As a rule, many polymers absorb radiation having a wavelength in the region of 10 μm. They can therefore be readily engraved with $CO_2$ lasers. Furthermore, for laser structuring of the polymer layers, it is possible to use solid-state lasers having wavelengths of about 1 μm. Examples are powerful Nd/NAG lasers having a wavelength of 1064 nm. Nd/YAG lasers have the advantage over $CO_2$ lasers that, owing to the substantially shorter wavelength, considerably higher resolutions are possible so that substantially finer structures can be engraved into the surface of the dies. Many polymers absorb the wavelength of solid-state lasers only to a small degree, if at all. Substances absorbing IR radiation can then be mixed with the laser-engravable polymer layer in order to increase the sensitivity. With the use of Nd/YAG lasers, the engraving frequently becomes possible only by the use of IR absorbers, or the speed of engraving can be increased with the use of $CO_2$ lasers. Suitable absorbers comprise strongly colored pigments, such as carbon black, or IR-absorbing dyes, which are usually strongly colored.

For engraving the surface structure, the laser-engravable layer is moved relative to the laser or to the laser component emitting the laser beam or the laser pulse (also referred to below as "laser" for short) and the laser is electronically modulated according to the movement, with the result that the desired pattern is produced.

For example, the laser-engravable layer or a suitable layer composite can be applied to a cylinder and the cylinder caused to rotate, and the cylinder can be moved in the axial direction and the laser modulated under electronic control according to the movement of the cylinder. However, it is also possible for the laser-engravable layer or the layer composite to be arranged in a planar manner and the laser-engravable layer and laser to be moved relative to one another in the plane of the layer or the layer composite, and for the laser to be modulated under electronic control according to the relative movement.

The laser-engravable layer or the layer composite may be present on a substrate; usually, it is present on a substrate. Examples of suitable substrates comprise woven fabrics and sheets of polyethylene terephthalate (PET), polyethylene naphthalate (PEN), polybutylene terephthalate, polyethylene, polypropylene, polyamide or polycarbonate, preferably PET or PEN sheets. Also suitable as substrates are papers and knitted fabrics, for example of cellulose. Conical or cylindrical tubes of said materials, so-called sleeves, can also be used as substrates. Glass fiber fabrics or composite materials comprising glass fibers and suitable polymeric materials are also suitable for sleeves. Other suitable substrate materials are metallic substrates, such as, for example, solid or fabric-like, sheet-like or cylindrical substrates of aluminum, steel, magnetizable spring steel, iron alloys or nickel.

The substrate can optionally be coated with an adhesion-promoting layer for better adhesion of the laser-engravable layer.

The laser-engravable layer comprises at least one binder, which may also be a prepolymer and which reacts in the course of a thermochemical reinforcement to form a polymer. Suitable binders are chosen by the person skilled in the art according to the desired properties of the laser-engravable layer or the die, for example with regard to hardness, resilience or flexibility. Suitable binders can be divided substantially into three groups, without there being any intension to limit the binders thereto.

The first group comprises those binders which have ethylenically unsaturated groups. The ethylenically unsaturated groups are crosslinkable photochemically, thermochemically, by means of electron beams or by means of any desired combination of these processes. In addition, mechanical reinforcement by means of fillers can be carried out. Such binders are, for example, those which comprise 1,3-diene monomers, such as isoprene or butadiene, incorporated in the form of polymerized units. The ethylenically unsaturated group may either act as a chain building block of the polymers (1,4-incorporation) or they can be bonded to the polymer chain as a side group (1,2-incorporation). Natural rubber, polybutadiene, polyisoprene, styrene/butadiene rubber, nitrile/butadiene rubber, acrylonitrile/butadiene/styrene (ABS) polymer, butyl rubber, styrene/isoprene rubber, polychloroprene, polynorbornene rubber, ethylene/propylene/diene rubber (EPDM) or polyurethane elastomers having ethylenically unsaturated groups may be mentioned as examples.

Further examples comprise thermoplastic elastomeric block copolymers of alkenylaromatics and 1,3-dienes. The block copolymers may be either linear block copolymers or radial block copolymers. Usually, they are three-block copolymers of the A-B-A type, but they may also be two-block polymers of the A-B type, or those having a plurality of alternating elastomeric and thermoplastic blocks, e.g. A-B-A-B-A. Blends of two or more different block copolymers can also be used. Commercial three-block copolymers frequently comprise certain proportions of two-block copolymers. The diene units may be 1,2- or 1,4-linked. Block copolymers of the styrene/butadiene and the styrene/isoprene type can be used. They are commercially available, for example, under the name Kraton®. Thermoplastic elastomeric block copolymers having terminal blocks of styrene and a random styrene/butadiene middle block, which are available under the name Styroflex®, can furthermore be used.

Further examples of binders having ethylenically unsaturated groups comprise modified binders in which crosslinkable groups are introduced into the polymeric molecule by grafting reactions.

The second group comprises those elastomeric binders which have functional groups, The functional groups are crosslinkable thermochemically, by means of electron beams, photochemically or by means of any desired combination of these processes. In addition, mechanical reinforcement by means of fillers can be carried out. Examples of suitable functional groups comprise —Si(HR)O—, —Si(RR')O—, —OH, —NH$_2$, —NHR, —COOH, —COOR, —COHN$_2$, —O—C(O)NHR, —SO$_3$H or —CO—. Examples of binders comprise silicone elastomers, acrylate rubbers, ethylene/acrylate rubbers, ethylene/acrylic acid rubbers or ethylene/vinyl acetate rubbers and the partly hydrolyzed derivatives thereof, thermoplastic elastomeric polyurethanes, sulfonated polyethylenes or thermoplastic elastomeric polyesters.

Of course, it is also possible to use elastomeric binders which have ethylenically unsaturated groups and functional groups. Examples comprise addition-crosslinking silicone elastomers having functional and ethylenically unsaturated groups, copolymers of butadiene with (meth)acrylates, (meth)acrylic acid or acrylonitrile, and furthermore copolymers or block copolymers of butadiene or isoprene with styrene derivatives having functional groups, for example block copolymers of butadiene and 4-hydroxystyrene.

The third group of binders comprises those which have neither ethylenically unsaturated groups nor functional groups. Polyolefins or ethylene/propylene elastomers or products obtained by hydrogenation of diene units, such as, for example, SEBS rubbers, may be mentioned here by way of example.

Polymer layers which comprise binders without ethylenically unsaturated or functional groups must as a rule be reinforced mechanically, with the aid of high-energy radiation or by a combination thereof in order to permit optimum crisp structurability by means of lasers.

It is of course also possible to use mixtures of two or more binders, which may comprise binders from in each case only one of the groups described or mixtures of binders from two or all three groups. The possible combinations are limited only insofar as the suitability of the polymer layer for the laser structuring process and the molding process must not be adversely influenced. Advantageously, it is possible to use, for example, a mixture of at least one elastomeric binder which has no functional groups with at least one further binder which has functional groups or ethylenically unsaturated groups.

The amount of elastomeric binder or binders in the elastomeric layer is usually from 30% by weight to 99% by weight, based on the sum of all components, preferably from 40 to 95% by weight and very particularly preferably from 50 to 90% by weight.

The laser-engravable polymer layer can optionally also comprise reactive low molecular weight or oligomeric compounds. Oligomeric compounds generally have a molecular weight of not more than 20 000 g/mol. Reactive low molecular Weight and oligomeric compounds are to be referred to below as monomers for the sake of simplicity.

Monomers can firstly be added for increasing the rate of the photochemical or thermochemical crosslinking or of the crosslinking by means of high-energy radiation, if this is desired. With the use of elastomeric binders from the first and second groups, the addition of monomers for acceleration is generally not absolutely essential. In the case of elastomeric binders from the third group, the addition of monomers is as a rule advisable without being absolutely essential in every case.

Regardless of the question of the crosslinking rate, monomers can also be used for controlling the crosslinking density. Depending on the type and amount of the low molecular weight compounds added, further or denser networks are obtained. Firstly, monomers used may be known ethylenically unsaturated monomers. The monomers should be substantially compatible with the binders and have at least one photochemically or thermochemically reactive group. They should not be readily volatile. The boiling point of suitable monomers is preferably not less than 150° C. Esters and amides or acrylic acid or methacrylic acid with mono- or polyfunctional alcohols, amines, aminoalcohols or hydroxyethers and hydroxyesters, styrene, or substituted styrenes, esters of fumaric or maleic acid or allyl compounds are particularly suitable. The examples comprise butyl acrylate, 2-ethylhexyl acrylate, lauryl acrylate, 1,4-butanediol diacrylate, 1,6-hexanediol diacrylate, 1,6-hexanediol dimethacrylate, 1,9-nonanediol diacrylate, trimethylolpropane trimethacrylate, trimethylolpropane triacrylate, dipropylene glycol diacrylate, tripropylene glycol diacrylate, dioctyl fumarate, N-dodecylmaleimide and triallyl isocyanurate.

Monomers particularly suitable for the thermochemical reinforcement comprise reactive low molecular weight silicones, such as, for example, cyclic siloxanes, Si—H-functional siloxanes, siloxanes having alkoxy or ester groups, sulfur-containing siloxanes and silanes, dialcohols, such as, for example, 1,4-butanediol, 1,6-hexanediol, 1,8-octanediol and 1,9-nonanediol, diamines, such as, for example, 1,6-hexanediamine and 1,8-octanediamine, aminoalcohols, such as, for example, ethanolamine, diethanolamine, butylethanolamine, and dicarboxylic acids, such as, for example, 1,6-hexanedicarboxylic acid, terephthalic acid, maleic acid or fumaric acid.

ω-hydroxyalkyl acrylates, such as, for example, ethylene glycol mono(meth)acrylate, 1,4-butanediol mono(meth)acrylate or 1,6-hexanediol mono(meth)acrylate, may be mentioned as examples.

It is of course also possible to use mixtures of different monomers, provided that the properties of the elastomeric layer are not adversely influenced by the mixture. As a rule, the amount of added monomers is from 0 to 40% by weight, based on the amount of all constituents of the recording layer, preferably from 0 to 20% by weight.

The elastomeric laser-engravable layer may furthermore comprise additives and assistants, such as, for example, IR absorbers, dyes, dispersants, antistatic agents, plasticizers and abrasive particles. However, the amount of such additives should as a rule not exceed 30% by weight, based on the amount of all components of the elastomeric layer.

The laser-engravable layer can also be composed of a plurality of individual layers. These part-layers may be of the same, approximately the same or different material composition. The thickness of the laser-engravable layer or of all individual layers together is as a rule from 0.1 to 10 mm, preferably from 0.5 to 3 mm. The thickness is suitably chosen by the person skilled in the art, depending on application-related and machine-related process parameters of the laser engraving process and of the molding process.

The laser-engravable layer can optionally furthermore have a top layer having a thickness of not more than 300 µm. The composition of such a top layer can be chosen with regard to optimum engravability and mechanical stability, while the composition of the layer underneath is chosen with regard to optimum hardness or resilience. The top layer must be either itself laser-engravable or must at least be removable together with the layer underneath in the course of the laser engraving. It comprises at least one polymeric binder. It may furthermore comprise an absorber for laser radiation or monomers or assistants.

The starting material for the process can be prepared, for example, by dissolving or dispersing all components in a suitable solvent and pouring on to a substrate. In the case of multi-layer elements, a plurality of layers can be cast one on top of the other in a manner known in principle. If the "wet-in-wet" method is employed, the layers bond well to one another. A top layer can also be poured on. Alternatively, the individual layers can be cast, for example, on temporary substrates and the layers subsequently bonded to one another by lamination. After the casting, a cover sheet for protecting the starting material from damage can also optionally be applied.

However, thermoplastic elastomeric binders or silicone elastomers are very particularly advantageously used for the process according to the invention. With the use of thermoplastic elastomeric binders, the production is preferably effected by extrusion between a substrate sheet and a cover sheet or a top element, followed by calendering, as disclosed, for example, for flexographic printing elements in EP-A 084 851. In this way, thicker layers can be produced in a single operation. Multi-layer elements can be produced by means of co-extrusion.

The laser-engravable layer is reinforced by heating (thermochemically), by exposure to UV light (photochemically) or by exposure to high-energy radiation (actinically) or by any desired combination thereof.

Thereafter, the layer or the layer composite is applied to a cylindrical (temporary) substrate, for example of plastic, glass fiber-reinforced plastic, metal or foam, for example by means of self-adhesive tape, reduced pressure, clamping apparatuses or magnetic forces, and engraved as described above. Alternatively, the planar layer or layer composite can also be engraved as described above. Optionally, the laser-engravable layer is washed using a rotary cylindrical washer or a continuous washer with a cleaning agent for removing engraving residues during the laser engraving process or after the laser engraving process.

In the manner described, the dye can be produced as a negative die or as a positive die.

In a first variant, the die has a negative structure so that the coating which can be bonded to a sheet-like substrate, for example a leather, can be obtained directly by application of a liquid plastic material to the surface of the die and subsequent solidification of the plastic material.

In a second variant, the die has a positive structure so that a negative die is first produced from the laser-structured positive die by molding. The coating which can be bonded to a sheet-like substrate can then be obtained from this negative die by application of a liquid plastic material to the surface of the negative die and subsequent solidification of the plastic material.

Preferably, surface structure elements having dimensions in the range from 10 to 500 µm are engraved into the die. The structure elements may be in the form of elevations or depressions. Preferably, the structure elements have a simple geometric shape and are, for example, circles, ellipses, squares, rhombuses, triangles and stars. The structure element may form a regular or irregular screen. Examples are a classical (autotypical) dot screen or a stochastic screen, for example a frequency-modulated screen or a frequency- and amplitude-modulated screen.

Here, an autotypical screen is a regular screen in which the spacing of the midpoints of the screen elements has a defined value and the angle of the screen axes has a defined value.

In the case of a frequency-modulated screen, the size of the screen element is constant but spacing and angle of the elements vary randomly.

In the case of an amplitude-modulated screen, the size of the screen elements varies randomly.

As mentioned above, the identification can be produced by varying the screen type (autotypical or stochastic screen) or—in the case of an autotypical screen—by varying the angle of the screen axes.

For example, the die can be engraved so that it has "wells" (depressions) which have a diameter of 10-500 µm on the surface of the die. The diameter is preferably 20-250 µm and particularly preferably 30-150 µm. The spacing of the wells is in general 10-500 µm, preferably 20-200 µm, particularly preferably 20-80 µm. The tonal values of the screen are in general from 3% to 50%.

Very particularly preferred screens for dies for the production of leather finishes are characterized as follows:

If it is a negative dies the following patterns are preferably engraved into the surface of the die for producing the coarse structure:

inverted autotypical screen having a substantially circular dot shape; dot diameter preferably from 20 to 250 µm, particularly preferably from 20 to 80 µm;

inverted frequency-modulated or frequency- and amplitude-modulated screen having a substantially circular dot shape, dot diameter preferably from 20 to 150 µm; tonal values preferably from 3 to 40%, particularly preferably from 5 to 30%.

If it is a positive die, the following patterns are preferably engraved into the surface of the die for producing the coarse structure:

autotypical screen having a substantially circular dot shape, dot diameter preferably from 20 to 250 µm, in particular from 20 to 80 µm;

frequency-modulated or frequency- and amplitude-modulated screen having a substantially circular dot shape, dot diameter preferably from 20 to 150 µm, tonal values preferably from 3 to 40%, particularly preferably from 5 to 30%.

However, the wells can also have another cross section, for example an elliptical or polygonal cross section. The depth of the wells is as a rule from 20 to 500 µm, preferably from 30 to 200 µm and particularly preferably from 60 to 200 µm. Such a die is used in general as a negative die for the production of leather finishes. A corresponding positive die can likewise be produced by laser engraving. This has the structure elements described in the form of elevations ("tiny hairs"). These have dimensions corresponding to the negative structure elements (depressions) described above.

In addition to a coarse surface structure, the die preferably has a fine surface structure. Both coarse and fine structure can be produced by laser engraving. The fine structure is produced by laser engraving if it is intended to produce a fine structure differing inside and outside the identification. The fine structure may be, for example, a microroughness having a roughness amplitude in the range of from 1 to 30 µm and a roughness frequency of from 0.5 to 30 µm. The dimensions of the roughness are preferably in the range of from 1 to 20 µm, particularly preferably from 2 to 15 µm and particularly preferably from 3 to 10 µm.

The die preferably additionally has a rough surface as fine surface structure, the dimensions of the roughness of the fine surface structure being smaller than the structure elements produced by means of laser structuring. Ideally, the roughness of the surface of the die is formed so that the coating formed by application of the liquid plastic material to the surface of the die and subsequent solidification of the plastic material has a gloss, according to DIN 67530, of less than 2.2 at an angle of incidence of 60°.

A rough surface structure can be produced either before, during or after the laser structuring. For example, the laser-structurable layer can be brought into contact with a rough surface before the reinforcement process so that the structure of this rough surface is reproduced on the die, if appropriate, also with application of temperature and/or pressure. The recording layer is then reinforced as described.

The invention is explained in more detail by the following examples.

EXAMPLES

Laser Structuring of the Laser-Engravable Layers

In the examples, a $CO_2$ laser engraving machine of the type BDE 4131 (from Stork Prints Austria GmbH, Kufstein) was used for structuring the laser-engravable layer. The machine has three sealed $CO_2$ lasers with a nominal power of 250 W each, the corresponding optical components and the associated periphery for control, laser cooling, exhaust air collection and exhaust air treatment. The cylindrical recording system consists either of a thin-walled cylindrical metal drum or of metal cones in which a so-called print sleeve consisting of a (generally multi-layer) cylindrical hollow cylinder of one or more plastics is clamped. The laser engraving tool is effected via a connected control computer by means of special output software. The output software interprets the motif present in the form of a grey step bitmap as a high profile in the form of pixels. Each grey step corresponds to a certain engraving depth or engraving power at the relevant point of the motif. Ideally, the relationship between grey step value and engraving depth is set to be approximately linear.

Example 1

The laser-engravable element used was a commercially available laser-structurable flexographic printing plate (Nyloflex® LD, Flint Group Germany GmbH) having a total layer thickness of 1.14 mm. The laser-engravable layer comprises a dimensionally stable PET substrate film having a layer thickness of 0.19 mm on the side facing away from the surface to be structured.

The unstructured layer was fixed on a cylindrical hollow metal cylinder (recording drum) for the duration of the engraving. During the engraving process, the engraving drum with the layer to be processed was moved uniformly relative to the laser beam in the axial direction. In this way, the laser beam passed spirally over the entire die area to be processed.

The layer serving as a positive die ("male die" or "father mold", which forms the counterpart of the negative die) was engraved with the following positive motif. The image data in those regions of the motif in which the security feature was to be imaged were modified as stated in the table.

| Motif No. | Function | Motif type |
|---|---|---|
| 1 | rod-like elevations ("tiny hairs") | tiny hairs with diameter = 86 µm midpoint spacing = 110 µm height ~170 µm |

-continued

| Motif No. | Function | Motif type |
|---|---|---|
|  |  | (corresponds in 2-dimensional projection to an autotypical screen of 130 lpi at 1778 dpi, tonal value 15%; screen angle used = 30°) |
| 2 | security feature variant A | inscription variant A: the engraving depth was reduced to ~120 µm in the region of the inscription |

In this way, a male die which had about 2600 tiny hairs/cm$^2$ and had an additional security feature in the form of an inscription which was imaged only in the substrate in the form of a smaller engraving depth was produced.

The positive die was subsequently cleaned with water and dried for 30 min at 65° C. With the aid of a room temperature-curing, filler-containing 2-component silicone elastomer, a negative die was produced from the positive die by thoroughly mixing the two components with one another and applying the mixture with the aid of a knife coating to the positive die. After curing at room temperature for the duration of 16 hours, a negative die was obtained by peeling off from the positive die.

According to WO 2005/035795 an aqueous plastic dispersion containing hollow microspheres was then applied to the negative die and solidified by removal of the water. The plastic coating thus obtained was bonded to the surface of a split leather with the aid of a single bonding layer having a net-like structure, according to WO 2005/047549.

The coated leather obtained had a visually attractive, suede-like surface having a pleasant handle. The security feature comprising an inscription could be recognized visually to different degrees at different angles of incidence of light without the haptic properties of the surface differing markedly in the regions of the security feature.

The surface section of the engraved positive die, magnified by means of a microscope, is shown in FIG. 1.

Example 2

A positive die having a structure comprising tiny hairs was produced analogously to example 1, the parameters shown in the table below having been used instead of the motif parameters mentioned in example 1:

| Motif No. | Function | Motif type |
|---|---|---|
| 1 | rod-like elevations ('tiny hairs') | tiny hairs with diameter = 86 µm midpoint spacing = 110 µm height = ~170 µm (corresponds in 2-dimensional projection to an autotypical screen of 130 lpi at 1778 dpi, tonal value 15%; screen angle used = 30°) |
| 2 | security feature variant B | inscription variant B: in the region of the inscription, the tips of the tiny hairs were set about 15 µm lower relative to the surface of the remaining tiny hairs. |

In this way, a positive die which had about 2600 tiny hairs/cm$^2$ and had an additional security feature in the form of an inscription which was imaged in the form of tiny hairs about 15 µm lower was produced.

Analogously to example 1, a negative die was produced from the positive die by means of reverse coating, with the aid of which negative die it was possible to produce a finished layer which was bonded to the surface of a split leather.

The coated leather obtained had a visually attractive, suede-like surface having a very pleasant handle. The security feature comprising the inscription could be visually recognized to different degrees at different angles of incidence of light, the haptic properties of the surface differing only minimally in the regions of the security feature.

Figure 2:
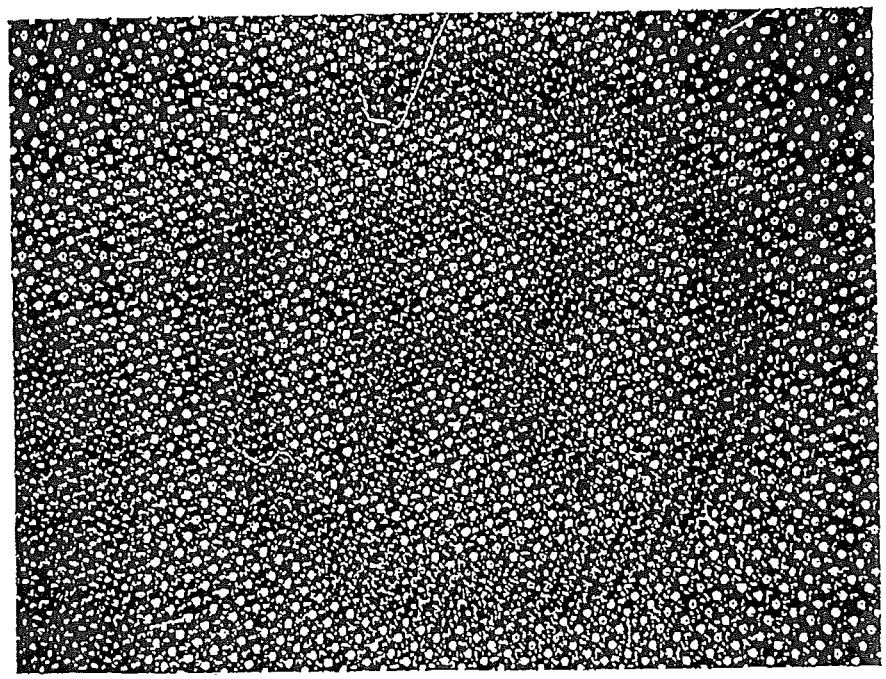

A surface section of the engraved positive die, magnified by means of a microscope is shown in FIG. 2.

Example 3

A positive die having a structure comprising tiny hairs was produced analogously to example 1, the parameters shown in the table below having been used instead of the motif parameters mentioned in example 1:

| Motif No. | Function | Motif type |
|---|---|---|
| 1 | rod-like elevations ('tiny hairs') | tiny hairs with diameter = 86 µm midpoint spacing = 110 µm height = ~170 µm (corresponds in 2-dimensional projection to an autotypical screen of 130 lpi at 1778 dpi, tonal value 15%; screen angle used = 30°) |
| 2 | security feature variant C | inscription variant C: in the region of the inscription, a tonal value of 25% with identical screen spacing was used so that the tiny hairs in the region of the inscription had a larger radius. |

In this way, a positive die which had about 2600 tiny hairs/cm$^2$ and had an additional security feature in the form of an inscription which was imaged in the form of thicker tiny hairs in the region of the inscription.

Analogously to example 1, a negative die was produced from the positive die by means of reverse coating, with the aid of which negative die it was possible to produce the finished layer which was bonded to the surface of a split leather.

The coated leather obtained had a visually attractive, suede-like surface having a very pleasant handle. The security feature comprising the inscription could be visually recognized to different degrees at different angles of incidence of light, the haptic properties of the surface differing only minimally in the regions of the security feature.

Figure 3:
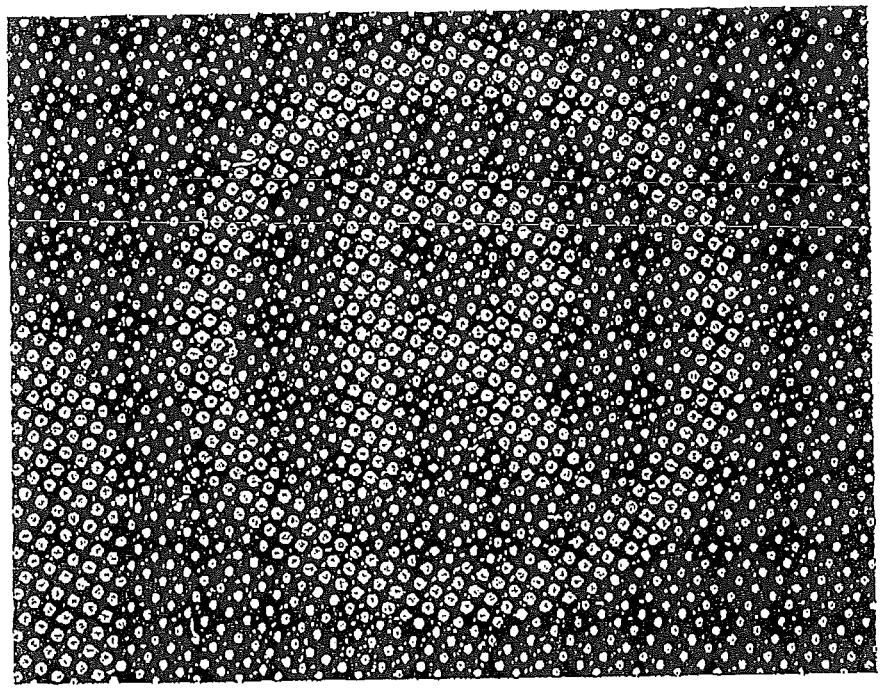

A surface section of the engraved positive die, magnified by means of a microscope is shown in FIG. 3.

Example 4

A positive die having a structure comprising tiny hairs was produced analogously to example 1, the parameters shown in the table below having been used instead of the motif parameters mentioned in example 1:

| Motif No. | Function | Motif type |
|---|---|---|
| 1 | rod-like elevations ('tiny hairs') | tiny hairs with diameter = 86 µm midpoint space = 110 µm height = ~170 µm (corresponds in 2-dimensional projection to an autotypical screen of 130 lpi at 1778 dpi, tonal value 15%; screen angle used = 30°) |
| 2 | security feature variant D | inscription variant D: in the region of the inscription, a screen angle of 45° was used instead of 30° at the same tonal value. |

In this way, a positive die which had about 2600 tiny hairs/cm² and had an additional security feature in the form of an inscription which was imaged in the form of tiny hairs arranged at a different angle.

Analogously to example 1, a negative die was produced from the positive die by means of reverse coating, with the aid of which negative die it was possible to produce the finished layer which was bonded to the surface of a split leather.

The coated leather obtained had a visually attractive, suede-like surface having a very pleasant handle. The security feature comprising the inscription could be visually recognized to different degrees at different angles of incidence of light, the haptic properties of the surface not differing markedly in the regions of the security feature.

Figure 4:
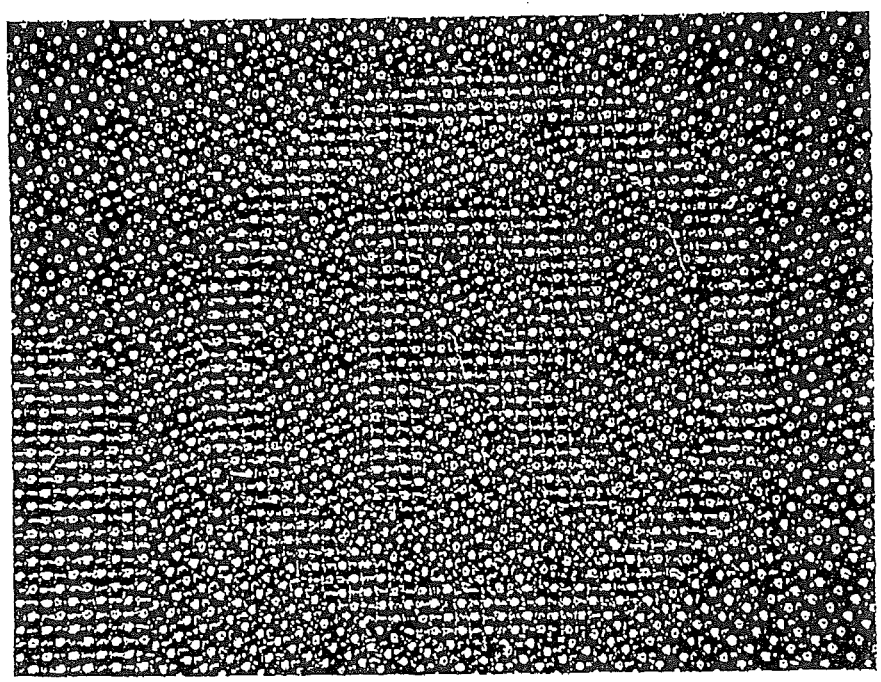

A surface section of the engraved positive die, magnified by means of a microscope is shown in FIG. 4.

Example 5

A laser-engravable layer having a rough surface, based on a room temperature-curing, filler-containing 2-component silicone elastomer, was produced by thoroughly mixing the two components with one another and applying the mixture with the aid of a knife coating to a temporary microrough PET coversheet. After curing for 16 hours at room temperature, the chemically reinforced elastomeric silicone layer was fixed with the aid of a silicone adhesive on a woven polyester fabric as a substrate element. The reinforced elastomeric layer obtained after removal of the temporary microrough PET cover sheet and having a woven fabric substrate had a total layer thickness of 1.7 mm. The layer composite obtained ("silicone die") was converted into sheet pieces of about 20×40 cm before the subsequent structuring.

The silicone die was fixed on a recording drum for the duration of the engraving with the aid of double-sided self-adhesive tape. During the engraving process, the engraving drum with the silicone layer to be processed was moved uniformly relative to the laser beam in the axial direction. In this way, laser beam passed spirally over the entire die area to be processed.

The silicone die was engraved with the following negative motif. The image data were modified in those regions of the motif in which the security feature was to be imaged, as stated in the table.

| Motif no. | Function | Motif type |
|---|---|---|
| 1 | crater-like depressions ("wells") | wells with diameter = 86 µm midpoint space = 129 µm height = ~170 µm (corresponds in 2-dimensional projection to an inverted autotypical screen of 77.5 l/cm at 1778 dpi, tonal value 35%; screen angle used = 30°) |
| 2 | security feature variant D | inscription variant D: in the region of the inscription a screen angle of 45° was used instead of 30° at the same tonal value. |

In this way, a die which had about 6000 wells/cm² and had an additional security feature in the form of an inscription which was imaged in the form of tiny hairs arranged at a different angle was produced.

An aqueous plastic dispersion comprising hollow microspheres was then applied to the die and solidified by removal of water, according to WO 2005/035795. The plastic coating thus obtained was bonded to the surface of a split leather with the aid of a single bonding layer having a net-like structure, according to WO 2005/047549.

The coated leather obtained had a visually attractive, suede-like surface having an extremely pleasant handle. The security feature comprising the inscription could be visually recognized to different degrees at different angles of incidence of light without the haptic properties of the surface markedly differing in the regions of the security feature.

Figure 5:
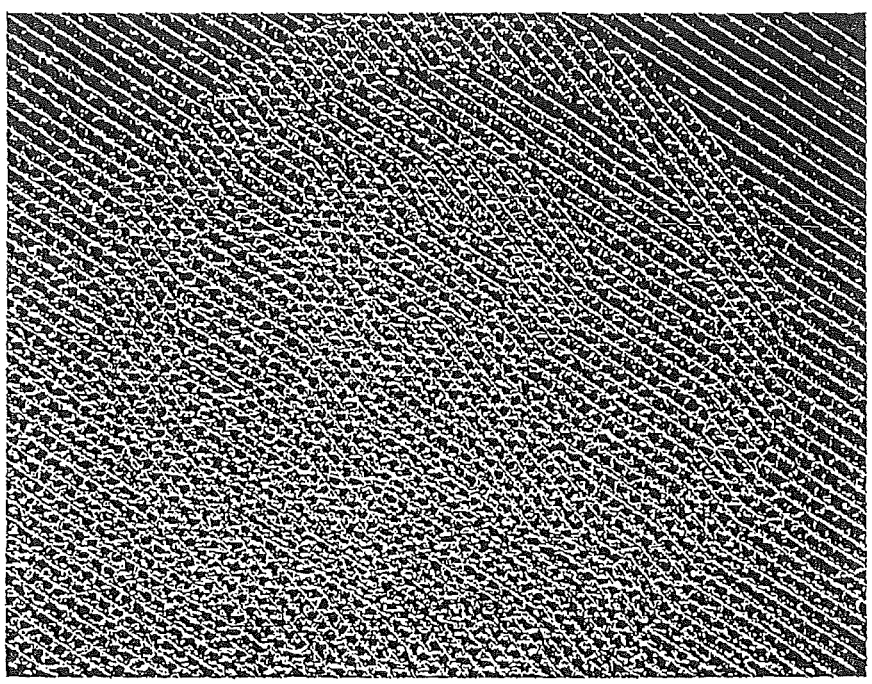
FIG. 5 is a surface section of an engraved silicone die.

The surface section of the engraved silicone die, magnified by means of a microscope, is shown in FIG. 5. In order to better visualize the different screen angles, white lines were drawn as an aid.

The invention claimed is:

1. A process for the production of a die for the production of a surface-structured coating (finish) which can be bonded to a sheet-like substrate, and which is formed by application of a liquid plastic material to the surface of the die and subsequent solidification of the plastic material, the die having a surface structure corresponding to the surface structure of the coating, the surface comprising surface structure elements arranged in a screen with the surface structure elements being in the form of elevations or depressions, the process comprising the steps:
    a) provision of a laser-engraveable elastomeric layer or a layer composite comprising a laser-engraveable elastomeric layer, optionally on a substrate, the laser-engraveable layer comprising a binder and further additives and assistants,
    b) thermochemical, photochemical or actinic reinforcement of the laser-engraveable elastomeric layer and
    c) engraving of a die surface structure corresponding to the surface structure of the finish into the laser-engraveable elastomeric layer using a laser, wherein a first surface structure comprising a plurality of structure elements is engraved in the region of the identification and a second surface structure comprising a plurality of structure elements that is different to the first surface structure is engraved in the rest of the die outside the identification, and wherein the first surface structure and the second surface structure have differing structure elements, the structure elements of the first surface structure forming the identification, and wherein the identification is a brand identification or a logo.

2. The process according to claim 1, wherein the die is a negative die or a positive die.

3. The process according to claim 2, wherein the structure elements are selected from circles, ellipses, squares, rhombuses, triangles, stars and further simple geometrical shapes.

4. The process according to claim 2, wherein the structure elements form a regular or irregular screen.

5. The process according to claim 2, wherein the die has a fine surface structure in addition to a coarse surface structure comprising surface structure elements, both coarse and fine structure being produced by laser engraving.

6. The process according to claim 2, wherein the die is a negative die.

7. The process according to claim 1, wherein a surface structure having structure elements which have dimensions in the range of from 10 to 500 µm is engraved into the die.

8. The process according to claim 1, wherein the identification is formed by surface structure elements having a size, geometry and/or arrangement differing from the environment.

9. The process according to claim 1, wherein the identification is formed by roughness of the substrate (fine surface structure) differing from the environment of the identification.

10. The process according to claim 1, wherein the first surface structure and the second surface structure are in the form of elevations or depressions.

\* \* \* \* \*